(12) United States Patent
Lettau

(10) Patent No.: US 8,972,839 B2
(45) Date of Patent: Mar. 3, 2015

(54) MEDIA PRESENTATIONS INCLUDING RELATED CONTENT

(75) Inventor: Tyler J. Lettau, Hercules, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1104 days.

(21) Appl. No.: 11/541,851

(22) Filed: Oct. 2, 2006

(65) Prior Publication Data

US 2013/0124988 A1     May 16, 2013

(51) Int. Cl.
    *G06F 17/21*           (2006.01)
    *G06F 17/22*           (2006.01)

(52) U.S. Cl.
    CPC .......... *G06F 17/211* (2013.01); *G06F 17/2264* (2013.01)
    USPC ............ 715/201; 715/792; 715/794; 715/810

(58) Field of Classification Search
    CPC ........................... G06F 17/211; G06F 17/2264
    USPC ........................... 715/792, 720, 794, 201, 810
    See application file for complete search history.

(56) References Cited

U.S. PATENT DOCUMENTS

| | | | | |
|---|---|---|---|---|
| 5,838,906 | A * | 11/1998 | Doyle et al. | 715/205 |
| 5,848,407 | A * | 12/1998 | Ishikawa et al. | 1/1 |
| 6,336,131 | B1 * | 1/2002 | Wolfe | 709/203 |
| 6,650,434 | B1 * | 11/2003 | Bruce | 358/1.18 |
| 6,892,352 | B1 * | 5/2005 | Myers | 715/719 |
| 7,865,873 | B1 * | 1/2011 | Zoellner et al. | 717/110 |
| 2002/0024532 | A1 * | 2/2002 | Fables et al. | 345/700 |
| 2002/0103789 | A1 * | 8/2002 | Turnbull et al. | 707/3 |
| 2003/0001900 | A1 * | 1/2003 | Cabanes et al. | 345/810 |
| 2003/0088830 | A1 * | 5/2003 | Tognazzini | 715/515 |
| 2003/0140309 | A1 * | 7/2003 | Saito et al. | 715/500 |
| 2003/0221167 | A1 * | 11/2003 | Goldstein et al. | 715/513 |
| 2004/0001106 | A1 * | 1/2004 | Deutscher et al. | 345/838 |
| 2004/0095376 | A1 * | 5/2004 | Graham et al. | 345/716 |
| 2004/0098671 | A1 * | 5/2004 | Graham et al. | 715/527 |
| 2004/0205448 | A1 * | 10/2004 | Grefenstette et al. | 715/500 |
| 2005/0144073 | A1 * | 6/2005 | Morrisroe et al. | 705/14 |
| 2005/0246651 | A1 * | 11/2005 | Krzanowski | 715/770 |
| 2005/0251737 | A1 * | 11/2005 | Kobayashi et al. | 715/513 |
| 2006/0031253 | A1 * | 2/2006 | Newbold et al. | 707/104.1 |
| 2006/0041590 | A1 * | 2/2006 | King et al. | 707/104.1 |
| 2006/0050996 | A1 * | 3/2006 | King et al. | 382/312 |
| 2006/0101341 | A1 * | 5/2006 | Kelly et al. | 715/738 |
| 2006/0195461 | A1 * | 8/2006 | Lo et al. | 707/100 |
| 2007/0011613 | A1 * | 1/2007 | Lane et al. | 715/709 |
| 2007/0130126 | A1 * | 6/2007 | Lucovsky et al. | 707/3 |
| 2007/0203891 | A1 * | 8/2007 | Solaro et al. | 707/3 |
| 2008/0010605 | A1 * | 1/2008 | Frank | 715/765 |
| 2008/0082929 | A1 * | 4/2008 | Stignani et al. | 715/764 |

OTHER PUBLICATIONS

Honan, Matthew, *Tackle the iTunes Music Store*, <http://www.macworld.com/2006/01/secrets/februaryplaylist/index.php> (visited Feb. 22, 2007).

* cited by examiner

*Primary Examiner* — Stephen Hong
*Assistant Examiner* — Marshon Robinson
(74) *Attorney, Agent, or Firm* — Wolfe-SBMC

(57) ABSTRACT

Media presentations including related content are described, including presenting a workspace and a content shelf, presenting a media presentation in the workspace, designating a portion of the media presentation based on parsing the media presentation according to a predetermined criterion, and displaying a content related to the portion of the media presentation in the content shelf.

24 Claims, 5 Drawing Sheets

MEDIA PRESENTATIONS INCLUDING RELATED CONTENT

FIELD OF THE INVENTION

The present invention relates generally to software. More specifically, media presentations including related content are described.

BACKGROUND OF THE INVENTION

A media presentation may be some type of electronic output that is presented to a user. Media presentations may come in many formats, and may include one or more of text, video, audio, and still images. Types of media presentations may include, for example, films, television programs, electronic books or e-books (e.g., novels), audio, newspapers, and webpages.

Media presentations may be viewed or otherwise observed by users using electronic devices such as personal computers, e-book readers, and televisions. Devices used to view or observed media presentations may therefore include various output devices, such as displays (e.g., computer monitors) and speakers.

A user of a media presentation may encounter material in the media presentation with which he is unfamiliar. For example, an e-book may include references to obscure historical figures, archaic words or phrases, exotic locales, or difficult-to-understand concepts. The subject matter of a video presentation (or other type of media presentation) may likewise leave a user confused.

Thus, what is needed is a media presentation and viewer without the limitations of conventional techniques.

BRIEF DESCRIPTION OF THE DRAWINGS

Various examples are disclosed in the following detailed description and the accompanying drawings.

DETAILED DESCRIPTION

Various examples may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

According to various examples, a workspace and a content shelf may be presented to a user (e.g., viewer or reader) of a media presentation. The workspace and the content shelf may be areas of a display in which a media presentation and content related to the media presentation may be presented, respectively. The media presentation may be parsed (e.g., searched) to select portions of the media presentation. For example, if the media presentation is a text-based media presentation, a portion may be one or more words that are selected based on one or more predetermined criteria. The predetermined criteria may be used to select portions that include uncommon terms, proper names, quotes, or any subject matter in which a user may be interested. Once the portions have been selected, content related to the portions may be generated. Content is anything that may be presented to a user and may include, for example, text, still images, video, audio, and interactive devices. The content may include, for example, a definition of an uncommon word, a map of a place, or a picture of a historical figure. According to various examples, the content may be generated by an author or distributor of the media presentation, or may be retrieved from local or remote sources such as the Internet.

Electronic Library

Figure 1:
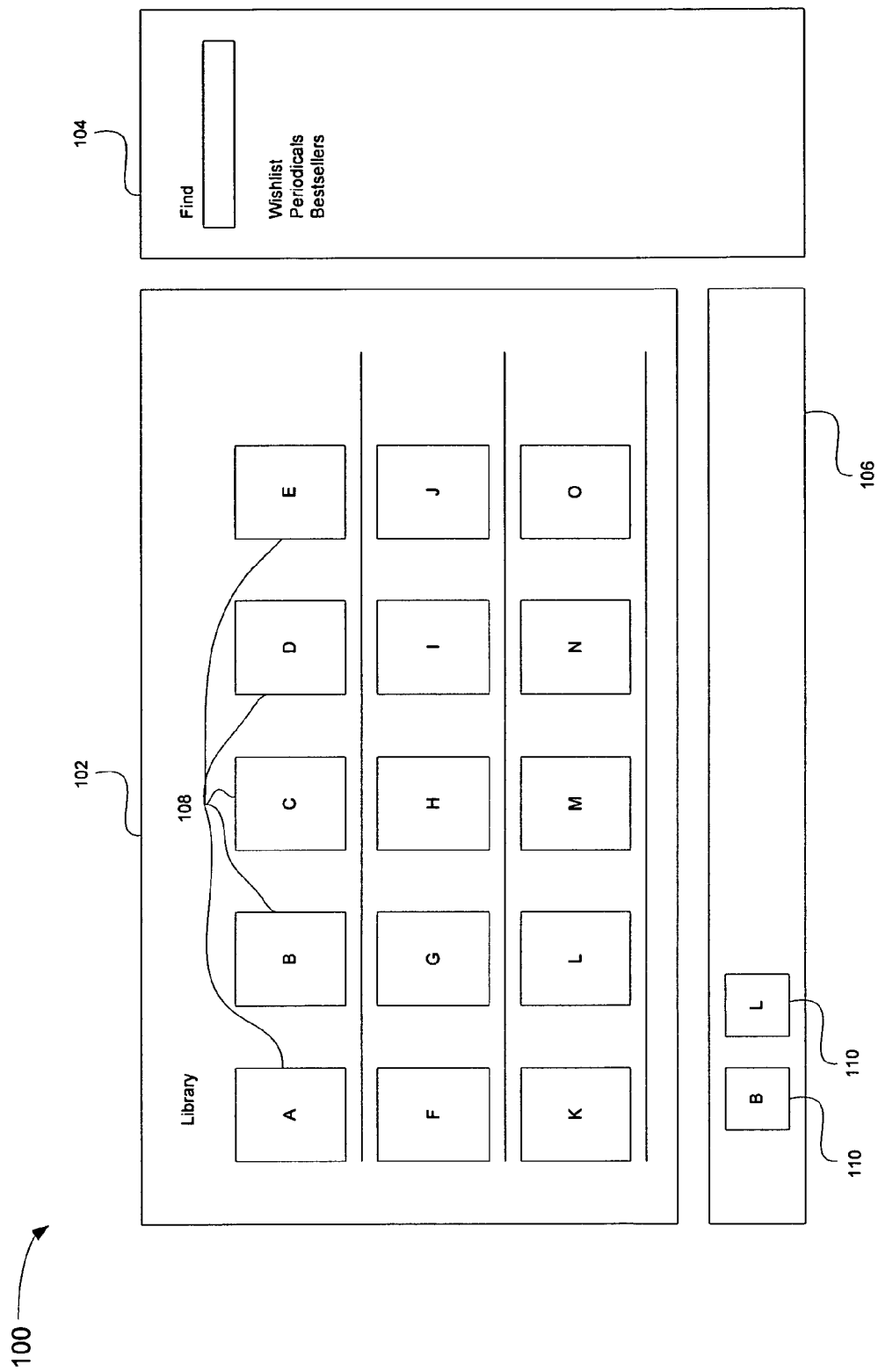
FIG. 1 illustrates an electronic library according to an example.

FIG. 1 illustrates an electronic library 100 according to an example. The electronic library 100 may be used to organize and view electronic and other media to which a user has access. The electronic library 100 may also be used to purchase additional media. The electronic library may include one or more areas. An area is a portion of the electronic library 100 in which various tasks (e.g., viewing media, navigation) may be performed. As shown here, the electronic library 100 includes three areas: a workspace 102, a side shelf 104, and a bottom shelf 106.

According to an example, the workspace 102 may be used as a main area of the electronic library 100. The workspace 102 may display icons 108, which may represent various electronic or traditional media. The media may be stored on a storage device in an electronic format, may otherwise be owned by a user of the electronic library 100. Additionally, a user may select one of the icons 108, and the workspace 102 may be used to view detail of the media represented by the icon (see FIG. 2). For example, an icon representing a newspaper may display articles of that newspaper when selected.

The side shelf 104 may serve various purposes. As shown here, the side shelf 104 may be used to search the various media stored in the electronic library 100, to access other media not in the electronic library 100, or to view various organized lists of media either in or not in the electronic library 100. The bottom shelf 106 may include navigational icons and/or representations 110 of the icons 108. The representations 110 may be used to indicate that the media presentations shown in the representations 110 are currently active or otherwise enjoy some special status.

The electronic library 100 described above may perform various functions other than those described here. Additionally, other areas, for example other shelves or additional workspaces, may also be located within the electronic library 100.

Electronic Reader

Figure 2:
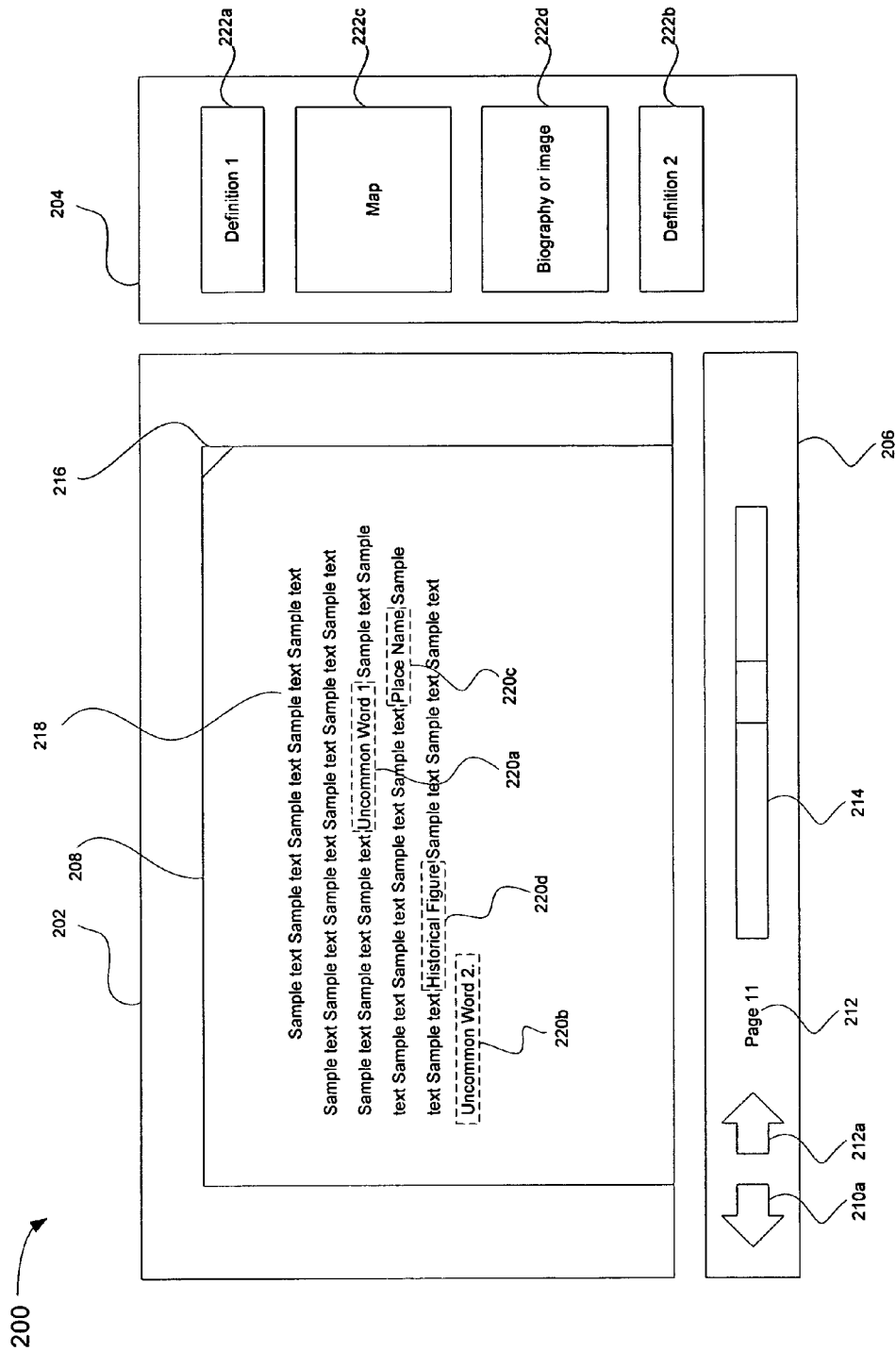
FIG. 2 illustrates an electronic reader according to an example.

FIG. 2 illustrates an electronic reader 200 according to an example. The electronic reader 200 may be used to read books, periodicals, or other texts that may be stored in an electronic format. The electronic reader 200 may be a graphical display shown on a computer system such as a personal computer or a handheld reader (e.g., an electronic-book (e-book) reader). According to another example, when a user chooses an icon 108 of the electronic library 100 to select a media presentation, the media presentation may be displayed in the workspace 102, and the electronic library 100 then becomes the electronic reader 200. Although the electronic reader 200 displays a text-based media presentation, it is understood that other types of media presentations may be similarly displayed in readers similar to the electronic reader 200. For example, video or audio media may also be displayed using similar readers or viewers.

The electronic reader 200, like the electronic library 100, includes one or more areas in which various tasks may be performed. As shown here, the electronic reader 200 includes a workspace 202, a content shelf 204, and a navigation shelf 206. The workspace 202 may be used to present (e.g., display) a media presentation 208. For example, a book is shown here. The workspace 202, content shelf 204, and navigation shelf 206 may be arranged in any fashion, may be any size, and may be accompanied by other areas according to various examples.

The navigation shelf 206 includes navigational elements, such as a back arrow 210*a*, a forward arrow 210*b*, a location indicator 212, and a scroll bar 214. The back arrow 210*a* may allow a user to return to an earlier part of the media presentation 208 (e.g., go to the previous page) or advance to a later part of the media presentation 208 (e.g., go to the next page). The scroll bar 214 may similarly allow a user to move throughout the media presentation 208. The location indicator 212 may display the current location of the media presentation 208 that is being shown (or otherwise presented) in the workspace 202. For example, the location indicator 212 displays "Page 11", indicating that page 11 of the media presentation 208 is currently being presented.

Other navigational elements may also be used. For example, a page corner 216 may also allow a user to "turn the page" by selecting (e.g., using a mouse click) the page corner 216. When a user turns a page, using the arrows 210, the scroll bar 214, or the page corner 216, the action may be accompanied by an animation of the page being turned.

The content shelf 204 may be used to provide additional content to a reader of the media presentation shown in the workspace 202. The content shelf 204 may display, for example, definitions, images, maps, and other content related to the media presentation. Other types of content may include interactive content. For example, an e-book of an arithmetic text may include an interactive calculator or times table. The content may be provided by an author of the media presentation or may be gathered by parsing the media presentation (e.g., by searching the media presentation) to determine content that may be useful or helpful for the reader.

The workspace 202 displays a media presentation 208. The media presentation may be an electronic book (e-book), for example. The media presentation 208 includes text 218, which further includes various highlighted terms 220. The terms 220 may be highlighted by using techniques such as underlining, outlining, or displaying a colored area near the terms 220 (e.g., a yellow box over a term). The terms 220 may be a portion of the media presentation 208 that have been selected by parsing the media presentation based on predetermined criteria. For example, an author or distributor of the media presentation may manually select portions of the media presentation. As another example, a pre-existing book may be electronically (i.e., automatically) parsed to search for terms that are uncommon, or that are proper names (e.g., place names or personal names) using predetermined criteria as is explained regarding FIG. 3.

The content shelf 204 may include various content related to the highlighted terms 220. For example, the terms 220*a* and 220*b* are uncommon words or terms. The media presentation 208 may be, for example, a novel that is quite old and includes archaic terms. The terms 220*a* and 220*b* may be such terms. A reader may not be familiar with the term 220*a*, and a definition 222*a* for the term 220*a* may be displayed in the content shelf 204. Likewise, a definition 222*b* for the term 220*b* may also be displayed in the content shelf 204.

According to an example, the content in the content shelf 204 may include a visual cue to indicate the portion (e.g., the term 220) with which it is associated. For example, the definition 222*a* may include the term 220*a* that it is defining. Other visual cues such as color or numbers may also be used to establish the association.

Additionally, the media presentation 208 may include references to proper names, such as place names (as shown in the term 220*c*) or proper names (e.g., historical figures) as shown in the term 220*d*. A map 222*c* of the place named in the term 220*c* may be displayed in the content shelf 204. The map 222*c* may be interactive; a reader may be able to select the map (e.g., using a mouse click) to summon an interactive or larger map. Likewise, a biography (or image) 222*d* of the person named in the term 220*d* may be displayed in the content shelf 204. According to an example, the biography 222*d* may be a capsule summary of the person's biography; a reader may select the biography 222*d* to read more about the referenced person.

The content (e.g., the definitions 222*a* and 222*b*, the map 222*c*, and the biography 222*d*) shown in the content shelf 204 may be culled from remote sources such as websites and displayed in a capsulated format such as is shown in FIG. 2. According to an example, when the media presentation 208, or a portion of the media presentation 208 is loaded (e.g., by selecting the media presentation 208 using the electronic library 100), the media presentation 208 may be parsed to select the terms 220. The content may then be displayed in the content shelf 204 by retrieving the content from remote or local sources such as online dictionaries, mapping services, or other content providers. Alternatively, the media presentation may be parsed in a more gradual manner. For example, when viewing an e-book, the media presentation 208 may be parsed every time a new page is display. When a user selects one of the navigation tools of the navigation shelf 206, the newly displayed page may be parsed to select portions. Related content for the selected portions (e.g., the terms 220) may then have generated and displayed in the content shelf 204.

According to another example, the media presentation may be parsed ahead of time, in order to reduce the amount of loading time while a reader is viewing the media presentation 208. According to this example, a distributor of the media presentation 208 may search the media presentation 208 using predetermined criteria to select portions of the media presentation 208. These portions may then be highlighted (as with the terms 220), and content related to the terms 220 may be selected to appear in the content shelf 204. The content may be included with a package (e.g., a file or group of files)

of the media presentation 208, or may be remotely accessed (e.g., using the Internet). The parsing may either be performed manually (e.g., by an author or distributor), or electronically (e.g., by searching, as in FIG. 3).

Parsing the Media Presentation

Figure 3:
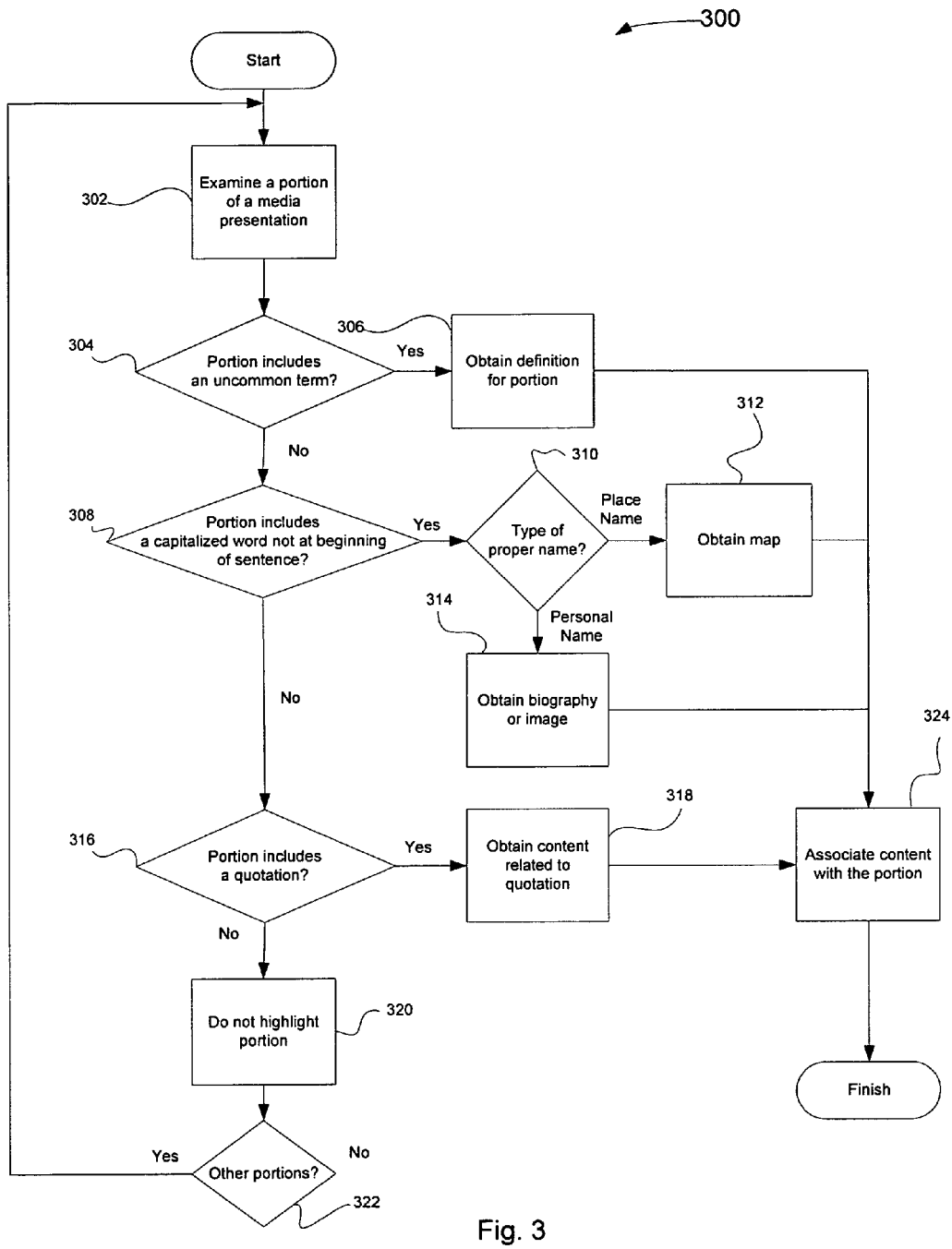
FIG. 3 is a flowchart describing a process for parsing a media presentation and selecting portions of the media presentation based on predetermined criteria according to various examples.

FIG. 3 is a flowchart describing a process 300 for parsing a media presentation and selecting portions of the media presentation based on predetermined criteria according to various examples. The process 300 generally describes parsing a media presentation (e.g., an e-book) for portions that may be unfamiliar to a viewer or may otherwise be amenable to the attachment of additional related content. The process 300 describes an automatic (e.g., computer assisted) process for parsing a new or existing work to select portions that may interest a viewer or reader. Various predetermined criteria may be used when selecting the portions for which content is obtained. The operations 304, 308, and 316 are examples of predetermined criteria that may be used to select portions of the media presentation.

In operation 302, a portion of the media presentation is examined. The portion may be a term comprising one or more words. For example, when the media presentation is a book or other written work, the portion may be a single word or a group of two or more words when it is determined that the group of words is related. The portion may be a word, a name, or a phrase.

In operation 304, it is determined whether the portion is a term (e.g., a word or phrase) that is uncommon. According to an example, this may be determined by comparing the term to a list of common words and phrases; if the term is absent from the list, it may be concluded that the term is uncommon. If the term is uncommon, in operation 306, a definition for the term is obtained. The definition may come from a source such as a dictionary, or may be produced by a distributor or author of the media presentation. If the term is common, the process 300 proceeds to operation 308.

In operation 308, it is determined whether a term comprising the portion is capitalized. Capitalization may indicate that the term is a proper name such as a place name or a personal name. Additionally, the operation 308 may ignore the term if it comes at the beginning of a sentence (which would automatically be capitalized). Also, in languages other than English (e.g., German), words that are not proper names are capitalized. In these cases, another technique may be used to determine whether the portion includes a proper name. For example, the contents of the portion may be compared to a database of proper names.

In some examples, if the term of the portion is capitalized, in operation 310, it is determined what type of proper name the portion describes. If the portion describes a place name, in operation 312, a map is obtained for the portion. If the portion describes a personal name, in operation 314, a biography or image is obtained for the portion. According to an example, if the term of the portion is capitalized, an image relating to the portion is obtained.

In other examples, if the term of the portion is not capitalized, in operation 316, it is determined whether the portion includes a quotation. A quotation may be identified, for example, by observing quotation marks (" ") at the beginning and the end of the portion. If the portion includes a quotation, in operation 318, a database of quotations may be searched, and related content to the quotation (e.g., who the author is, a biographical sketch of the author) may be provided.

If the portion is not a quotation, in operation 320, it may be determined that the portion does not deserve to be highlighted. In operation 322, it is determined whether there are any remaining portions of the media presentation to be examined. If there are remaining portions, the process 300 returns to the operation 302. If there are no more remaining portions, the process 300 finishes.

In operation 324, once content appropriate for the portion has been obtained, the content may be associated with the portion. The association may allow a reader or viewer to determine that the content is related to the portion. For example, the portion may be the term 220a, and the content (e.g., the definition 222a) may include a visual cue that the two are related. The content may be associated with the portion to display the content in the content shelf when the media presentation is presented.

The process 300 is an example of a process that may be used to generate content (e.g., the definitions 222a and 222b, the map 222c, and the biography 222d) to display in a content shelf (e.g., the content shelf 204) of a viewer such as the electronic reader 200. Other operations may be added to the process 300, and some operations may be removed. For example, proper names may be found by comparing the portion to a database of proper names. Further, media presentations of a type other than a text-based media presentation may also be used. For example, the media presentation may be an image. The image may be analyzed using image recognition software to determine the subject of the image, and content related to the subject of the image may be retrieved. As another example, an audio presentation may also have related content. The audio presentation may include metadata indicating the subject matter of the presentation, which can then be used to search for the content. Alternatively, audio analysis software may be used to find appropriate related content.

Presentation of the Media Presentation Including Related Content

Figure 4:
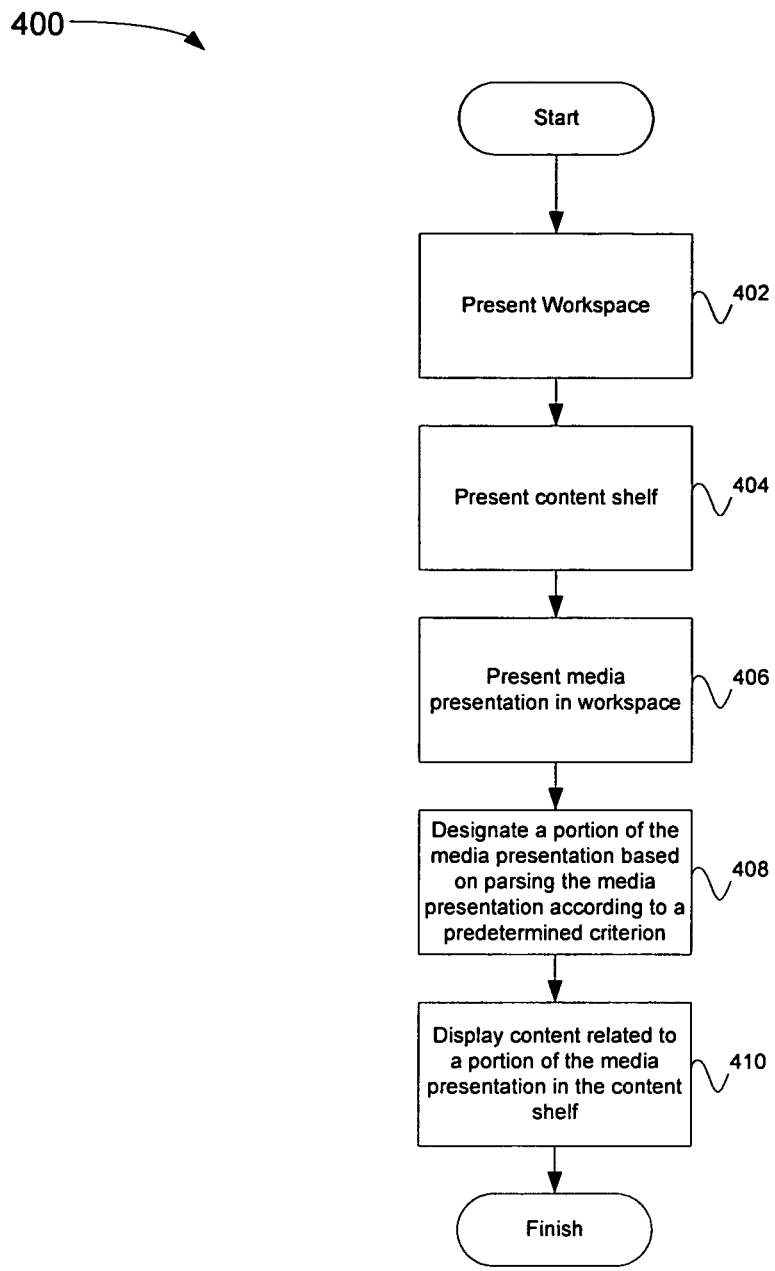
FIG. 4 is a flowchart describing a process for presenting a media presentation including related content according to an example.

FIG. 4 is a flowchart describing a process 400 for presenting a media presentation including related content according to an example. The process 400 generally describes presenting (e.g., displaying) a media presentation (e.g., an e-book) using an electronic device such as a personal computer or e-book reader.

In operation 402, a workspace is presented. The workspace may be, for example, the workspace 202 of the electronic reader 200. In operation 404, a content shelf is presented. The content shelf may be, for example, the content shelf 204, and may be presented adjacent to or near the workspace. The content shelf may also be presented in any other location. The content shelf may be used to present content related to the media presentation, such as the definitions 222a and 222b, the map 222c, and the biography 222d. According to an example, the workspace and the content shelf may be presented by displaying (e.g., drawing) the workspace and content shelf on a display such as a monitor.

In operation 406, a media presentation is presented in the workspace. The media presentation may be, for example, a text-based media presentation such as an e-book, an image, audio clip, or video clip.

In operation 408, a portion of the media presentation is designated based on parsing the media presentation according to a predetermined criterion. The media presentation may be parsed, and the portion selected using, for example, the process 300 or one like it. The predetermined criterion may be one of the operations 304, 308, or 316, or another similar criterion. Designating the portion may include highlighting the portion. For example, the terms 220 may be designated by various techniques such as highlighting, outlining, or underlining.

In operation 410, a content related to the portion of the media presentation is displayed in the content shelf. The portion may be determined by parsing the media presentation and selection the portion based on a predetermined criterion. The predetermined criterion may be one of the criteria discussed above regarding the process 300. The related content may be generated by an author or distributor of the media presentation, or may be retrieved from a remote or local source.

An Exemplary Computer System

Figure 5:
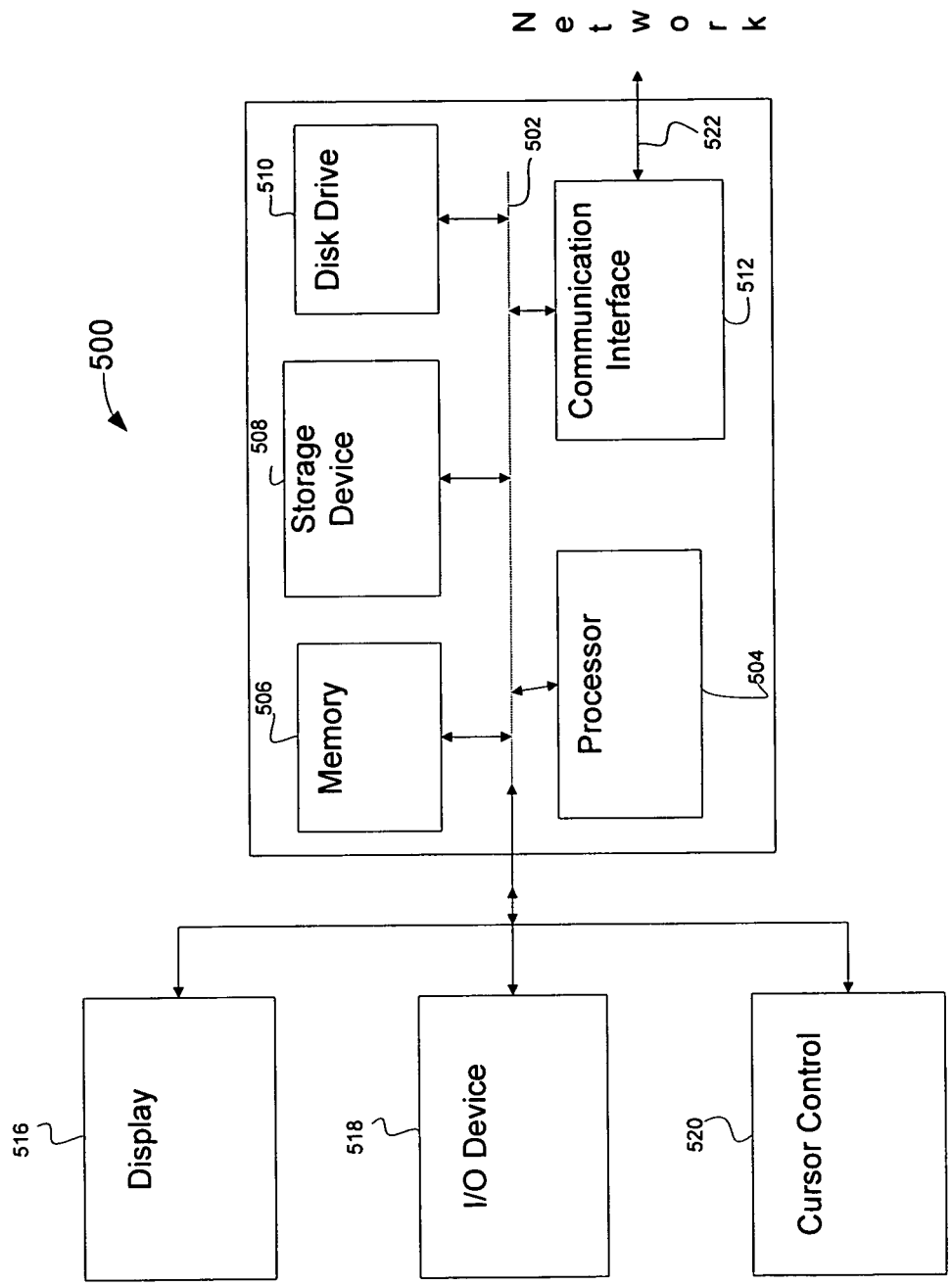
FIG. 5 is a block diagram illustrating an exemplary computer system suitable for parsing media presentations and presenting media presentations including related content, in accordance with various examples.

FIG. 5 is a block diagram illustrating an exemplary computer system suitable for parsing media presentations and presenting media presentations including related content, in accordance with various examples. In some examples, a computer system 500 may be used to implement computer programs, applications, methods, processes, or other software to perform the above-described techniques. The computer system 500 includes a bus 502 or other communication mechanism for communicating information, which interconnects subsystems and devices, such as a processor 504, a system memory 506 (e.g., RAM), a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a cursor control 518 (e.g., mouse or trackball).

According to some examples, the computer system 500 performs specific operations by processor 504 executing one or more sequences of one or more instructions stored in the system memory 506. Such instructions may be read into the system memory 506 from another computer readable medium, such as the static storage device 508 or the disk drive 510. In some examples, hard-wired circuitry may be used in place of or in combination with software instructions to implement the examples.

Although the foregoing examples have been described in some detail for purposes of clarity of understanding, the examples are not limited to the details provided. There are many alternative ways of implementing the examples. The disclosed examples are illustrative and not restrictive.

What is claimed:

1. A method, comprising:
searching a media presentation document to identify portions of the document that satisfy one or more predetermined search criteria, which include the portions of the document being identifiable, via a search, as relating to a definition, a biography, or a map;
determining, for each identified portion of the document, content related to the identified portion of the document;
receiving user input to display a page of the document in a workspace of an application; and
in response to receiving the user input to display the page of the document:
displaying the page of the document in the workspace, the identified portions of the document that are included on the displayed page being visually distinguished from other content on the displayed page;
concurrently displaying, in a content shelf of the application, the content that is determined to be related to the identified portions of the document included on the displayed page, including concurrently displaying the content and a representation of interactive content related to multiple different identified portions of the document in the content shelf if the displayed page includes the multiple different identified portions of the document and at least one of the multiple different identified portions of the document is related to the interactive content, the representation providing a preview of the interactive content available by selecting the representation; and
launching the interactive content from the content shelf based on a user selection of the representation from the content shelf.

2. The method of claim 1, wherein one of the predetermined search criteria is that a term is uncommon, wherein an uncommon term is likely to be unfamiliar to a viewer of the document.

3. The method of claim 1, wherein one of the predetermined search criteria is that a term is a proper name.

4. The method of claim 1, wherein:
the displayed page includes two or more of the identified portions; and
the two or more identified portions are both visually distinguished from the other content on the displayed page.

5. The method of claim 1, wherein concurrently displaying the content that is determined to be related to the identified portions of the document included on the displayed page further includes displaying a visual cue for each portion of the content displayed in the content shelf indicating with which of the identified portions of the document the portion of the content displayed in the content shelf corresponds.

6. The method of claim 1, further comprising presenting a navigation shelf comprising a navigational element to navigate the media presentation.

7. The method of claim 1, wherein the content that is determined to be related to the identified portions of the document included on the displayed page includes one or more of:
a definition of an uncommon term when the identified portions comprise the uncommon term,
a biography when the identified portions comprise a personal name, or
a map when the identified portions comprise a place name.

8. The method of claim 1, wherein visually distinguishing the identified portions of the document that are included on the displayed page comprises highlighting the identified portions on the displayed page.

9. The method of claim 1, wherein displaying the page of the document comprises displaying the page in an electronic book.

10. The method of claim 1, wherein displaying the page of the document comprises presenting a video.

11. A method, comprising:
searching a media presentation document to identify portions of the document that satisfy one or more predetermined search criteria, one of the predetermined search criteria being that the term is uncommon, an uncommon term likely being unfamiliar to a viewer of the document;
determining, for each identified portion of the document, content related to the identified portion of the document;
receiving navigation input to display a page of the document in a workspace of an application;
in response to said receiving the navigation input to display the page of the document:
displaying the page of the document in the workspace, the identified portions of the document that are included within the displayed page being visually distinguished from other content of the displayed page;
concurrently displaying, in a content shelf of the application, the content that is determined to be related to the identified portions of the document included in the displayed page, including concurrently displaying the content and a representation of interactive content related to multiple different identified portions of the document in the content shelf if the displayed page includes the multiple different identified portions of the document and at least one of the multiple different identified portions of the document is related to the interactive content, the representation providing a preview of the interactive content available by selecting the representation; and launching the interactive content from the content shelf based on a user selection of the representation from the content shelf.

12. The method of claim 11, wherein one of the predetermined search criteria is that a term is a proper name.

13. The method of claim 11, wherein searching the media presentation document comprises determining whether at least one of the portions of the document comprises a capitalized term.

14. The method of claim 13, further comprising:
determining whether the capitalized term comprises a personal name; and
obtaining a biography if the capitalized term comprises the personal name.

15. The method of claim 13, further comprising:
determining whether the capitalized term comprises a place name; and
obtaining a map if the capitalized term comprises the place name.

16. The method of claim 11, further comprising obtaining a definition of the uncommon term.

17. A system, comprising:
a memory configured to store a media presentation document; and
a processor configured to implement an application that is configured to:
search the media presentation document to identify portions of the document that satisfy one or more predetermined search criteria, which include the portions of the document being identifiable, via a search, as relating to a definition, a biography, or a map;
determine, for each identified portion of the document, content related to the identified portion of the document;
receive user input to display a page of the document in a workspace of the application;
in response to receiving the user input to display the page of the document, the application automatically configured to:
display the page of the document in the workspace, the identified portions of the document that are included on the displayed page being visually distinguished from other content of the displayed page; and
concurrently display, in a content shelf of the application, the content that is determined to be related to the identified portions of the document included in the displayed page, including concurrently display the content and a representation of interactive content related to multiple different identified portions of the document in the content shelf if the displayed page includes the multiple different identified portions of the document and at least one of the multiple different identified portions of the document is related to the interactive content; and launch the interactive content from the content shelf based on a user selection of the representation from the content shelf.

18. The system of claim 17, wherein one of the predetermined search criteria is that a term is uncommon, wherein an uncommon term is likely to be unfamiliar to a viewer of the document.

19. The system of claim 18, wherein the application is further configured to display a definition of the term.

20. The system of claim 17, wherein the application is further configured to highlight the identified portions of the document that are included on the displayed page to visually distinguish those portions from the other content of the displayed page.

21. A device comprising:
memory;
one or more processors; and
computer storage media storing instructions that, responsive to execution via the one or more processors, cause the device to perform operations including:
searching a media presentation document to identify portions of the document that satisfy one or more predetermined search criteria, one of the predetermined search criteria being that a term is uncommon;
determining, for each identified portion of the document, content related to the identified portion of the document;
receiving navigation input to display a page of the document in a workspace of an application;
in response to receiving the navigation input to display the page of the document:
displaying the page of the document in the workspace, the identified portions of the document that are included on the displayed page being visually distinguished from other content on the displayed page;
concurrently displaying, in a content shelf of the application, the content that is determined to be related to the identified portions of the document included on the displayed page, including concurrently displaying the content and a representation of interactive content related to multiple different identified portions of the document in the content shelf if the displayed page includes the multiple different identified portions of the document and at least one of the multiple different identified portions of the document is related to the interactive content, the representation providing a preview of the interactive content available by selecting the representation; and
launching the interactive content from the content shelf based on a user selection of the representation from the content shelf.

22. The device of claim 21, wherein an uncommon term is likely to be unfamiliar to a viewer of the document.

23. The device of claim 22, wherein the content shelf is configured to display a definition of the uncommon term.

24. The device of claim 21, wherein visually distinguishing the identified portions of the document that are included on the displayed page comprises highlighting those portions of the document.

* * * * *